(12) United States Patent
Waller et al.

(10) Patent No.: US 10,652,439 B2
(45) Date of Patent: May 12, 2020

(54) UNIVERSAL SECURITY BOX FOR SURVEILLANCE EQUIPMENT

(71) Applicants: Donald Ray Waller, Colombus, OH (US); Christopher W Leadbeater, Marengo, OH (US)

(72) Inventors: Donald Ray Waller, Colombus, OH (US); Christopher W Leadbeater, Marengo, OH (US)

(*) Notice: Subject to any disclaimer, the term of this patent is extended or adjusted under 35 U.S.C. 154(b) by 0 days.

(21) Appl. No.: 16/266,757

(22) Filed: Feb. 4, 2019

(65) Prior Publication Data

US 2019/0246015 A1    Aug. 8, 2019

Related U.S. Application Data

(60) Provisional application No. 62/626,480, filed on Feb. 5, 2018.

(51) Int. Cl.
*H04N 5/225* (2006.01)
*G03B 17/56* (2006.01)
*F16B 2/12* (2006.01)

(52) U.S. Cl.
CPC ............. *H04N 5/2252* (2013.01); *F16B 2/12* (2013.01); *G03B 17/561* (2013.01)

(58) Field of Classification Search
CPC ............... H04N 5/2251; H04N 5/2252; H04N 7/18–188; G03B 17/00–17; G03B 17/56; G03B 17/561; G08B 13/19617; G08B 13/19619; B65D 7/00–48; B65D 9/00–38; B65D 11/00–28; B65D 13/00–04; B65D 45/025; F16B 2/12; F16B 5/0216; F16B 5/0225
See application file for complete search history.

(56) References Cited

U.S. PATENT DOCUMENTS

| | | | | |
|---|---|---|---|---|
| 7,345,707 B1* | 3/2008 | McClain | ............... | G03B 17/00 348/151 |
| 9,057,933 B1* | 6/2015 | Montgomery, Jr. | ... | A45C 11/38 |
| 9,075,290 B1* | 7/2015 | Thieman | ............. | G03B 17/561 |
| 2001/0042814 A1* | 11/2001 | Sui | .......................... | B60R 11/00 248/231.51 |
| 2009/0129769 A1* | 5/2009 | Broberg | ................. | F16M 11/10 396/428 |
| 2009/0194443 A1* | 8/2009 | Cuddeback | .......... | G03B 17/568 206/316.2 |
| 2010/0158499 A1* | 6/2010 | Kendall | ................. | G03B 17/00 396/428 |
| 2012/0301129 A1* | 11/2012 | Smith | .................. | F16M 13/022 396/427 |

* cited by examiner

*Primary Examiner* — Paul M Berardesca

(57) ABSTRACT

A universal security box for surveillance equipment is an apparatus houses and suspends a camera. The apparatus includes a fixed jaw, a slideable jaw, and a main fastener. The fixed jaw includes a mounting plate, a first head, a third lateral wall, a main slot, and a main interconnecting hole. The slideable jaw includes a height-adjustable plate, a second head, a plurality of interconnecting holes, and at least one locking hole. The first head and the second head clamp around a camera. The mounting plate allows the apparatus to be mounted with tree trunk, a pole, a wall, and so on. The height-adjustable plate is slidable across the mounting plate with the third lateral wall and the main slot. The main interconnecting hole and the at least one locking hole allows a desired distance between the first head and the second head with the main fastener.

20 Claims, 6 Drawing Sheets

UNIVERSAL SECURITY BOX FOR SURVEILLANCE EQUIPMENT

The current application claims priority to U.S. provisional application Ser. No. 62/626,480 filed on Feb. 5, 2018.

FIELD OF THE INVENTION

The present invention relates generally to an apparatus for securing cameras and the like. Specifically, the present invention is a universal security lock box for cameras and the like.

BACKGROUND OF THE INVENTION

In today's present society, more people are learning how to hunt game and/or participating in hunting game. To further enhance the experiences involved in hunting game, people can utilize equipment and apparatus to better track their game, such as cameras. However, most of the time, people have to leave their cameras out in the wilderness in order for game to return to that area. Sometimes it can take long stretches of times the area is occupied by game. Because the person has to leave their camera unattended for long stretches of time, their cameras are vulnerable to being stolen by other people or damaged by another individual or another passing game. Although security lock boxes already exist for cameras in order to prevent theft and damages, these security lock boxes are only intended for a single type, kind, and brand of camera. Also, these security lock boxes for cameras and the like often unnecessarily damages the tree to which the device is attached to. Additionally, due to shape and material, the currently marketed security lock boxes for cameras are more pervious to being cut and or damaged by thieves using conventional tools.

An objective of the present invention is to provide users with a universal security lock box for cameras and the like. The present invention intends to provide users with a security lock box that can be adapted for any kind, type, and/or brand of cameras and the like. Another objective of the present invention is to be more securable than other currently existing devices. The present invention intends to provide users with an apparatus that is more impervious to being stolen and damaged by a passerby and/or passing game through the shape, size, and material of the present invention. Also, the present invention intends to diminish, or at least minimize, the damage that trees can sustain when attached a security lock box to a tree.

DETAILED DESCRIPTION OF THE INVENTION

Figure 1:
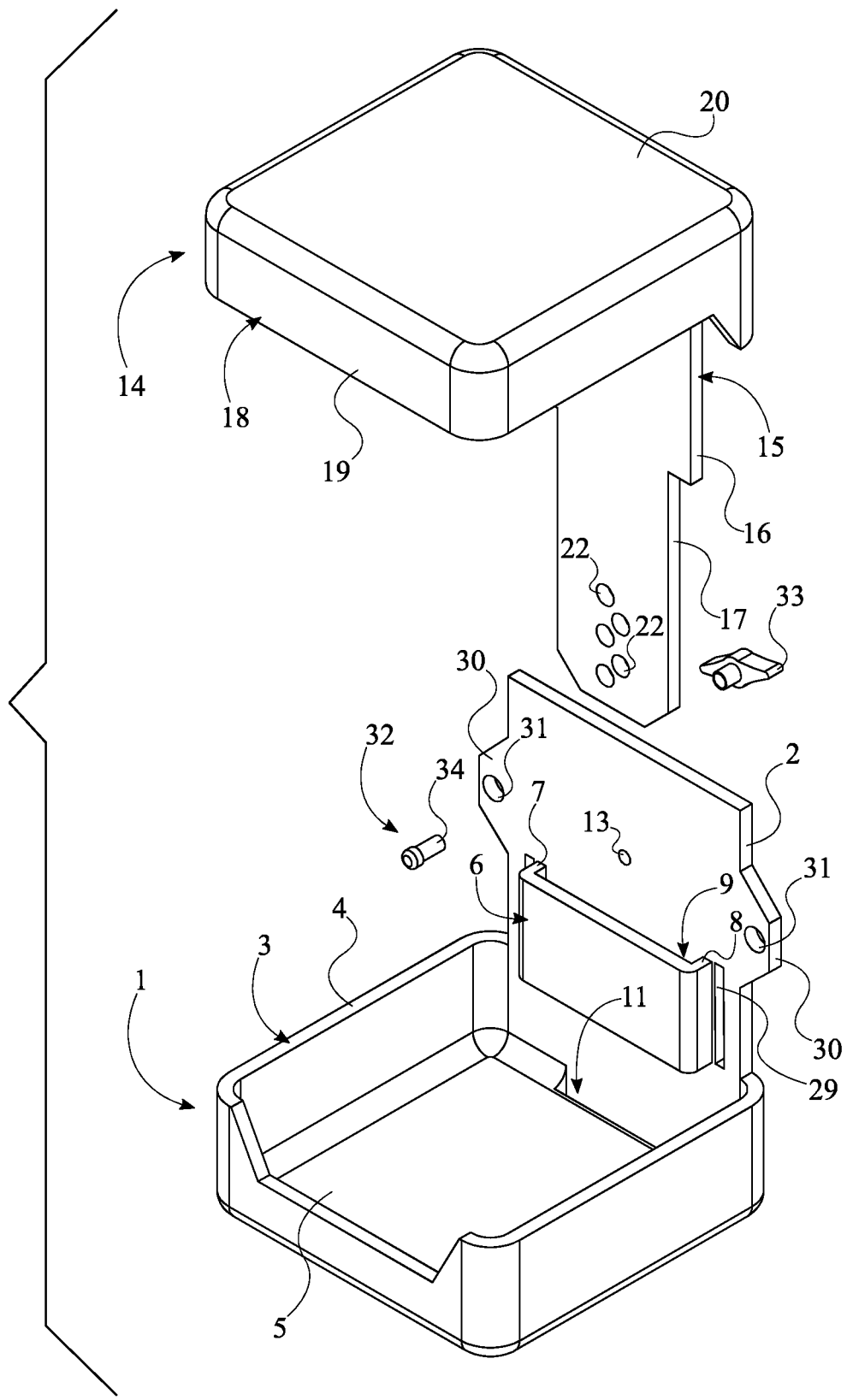
FIG. 1 is a front exploded view of the present invention.

All illustrations of the drawings are for the purpose of describing selected versions of the present invention and are not intended to limit the scope of the present invention.

The present invention is a universal security box for surveillance equipment, more specifically cameras. The present invention preferably secures and houses a single camera unit. The present invention is able to house a variety of cameras and is mountable to a variety of surfaces. The present invention effectively clamps around a camera without blocking a lens of the camera as the present invention comprises a fixed jaw 1, a slideable jaw 14, and a main fastener 32, seen in FIG. 1, FIG. 2, and FIG. 3. In order for the fixed jaw 1 to suspend a camera the fixed jaw 1 comprises a mounting plate 2, a first head 3, a third lateral wall 6, a main slot 11, and a main interconnecting hole 13. The slideable jaw 14 comprises a height-adjustable plate 15, a second head 18, a plurality of interconnecting holes 21, and at least one locking hole 22. The mounting plate 2 allows the first head 3, and consequently the slideable jaw 14, to be mounted to a desired surface such as a wall or a tree trunk. The first head 3 upholds the camera and the second head 18 presses the camera against the first head 3. The height-adjustable plate 15 allows the distance between the first head 3 and the second head 18 to vary depending on the size of a corresponding camera. The third lateral wall 6 orients and connects the slideable jaw 14 with the fixed jaw 1. The main slot 11 and the at least one locking hole 22 allow the slideable jaw 14 to be locked with the fixed jaw 1. The slideable jaw 14 is locked with the fixed jaw 1 preferably with a padlock, a zip-tie, and other similar fasteners. The fastener engages with the at least one locking hole 22 and the main slot 11 allows the at least one locking hole 22 to traverse past the first head 3, such that the fastener stops the height-adjustable plate 15 from being separated from the fixed jaw 1. The main interconnecting hole 13 and the plurality of interconnecting holes 21 allows cameras of varying sizes to be clamped between the fixed jaw 1 and the slideable jaw 14 with the main fastener 32.

The overall configuration of the aforementioned components allows a variety of cameras to be secured with the present invention. A camera is surrounded by the present invention as the first head 3 is terminally fixed adjacent the mounting plate 2, and the second head 18 is terminally fixed adjacent the height-adjustable plate 15, seen in FIG. 1 and FIG. 3. In order for the height-adjustable plate 15 to remain pressed against the mounting plate 2, a first end 7 and a second end 8 of the third lateral wall 6 are fixed adjacent the mounting plate 2, and the main slot 11 traverses through the first head 3, positioned adjacent the mounting plate 2. The height-adjustable plate 15 is slidably engaged between the third lateral wall 6 and the mounting plate 2 and through the main slot 11, thereby allowing cameras of varying sizes to be contained between the first head 3 and the second head 18. The desired distance between the first head 3 and the second head 18 is fixed as the main interconnecting hole 13 laterally traverses through the mounting plate 2, and the plurality of interconnecting holes 21 traverses through the height-adjustable plate 15. Moreover, the slideable jaw 14 is removably attached with the fixed jaw 1 with the main fastener 32 through the main interconnecting hole 13 and a corresponding interconnecting hole of the plurality of interconnecting holes 21.

Figure 5:
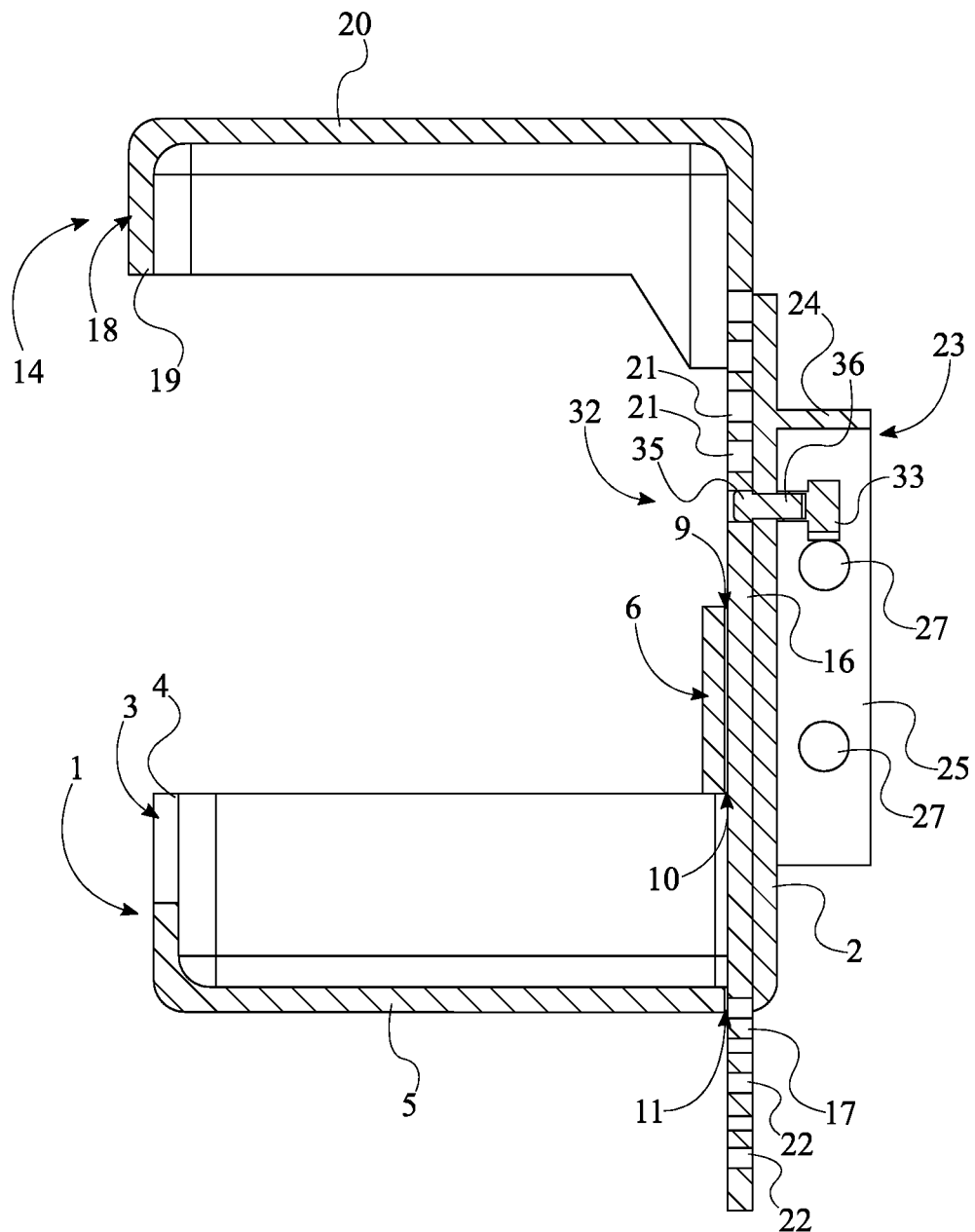
FIG. 5 is a cross-section view of FIG. 4 along line 5-5 of the present invention.
Figure 6:
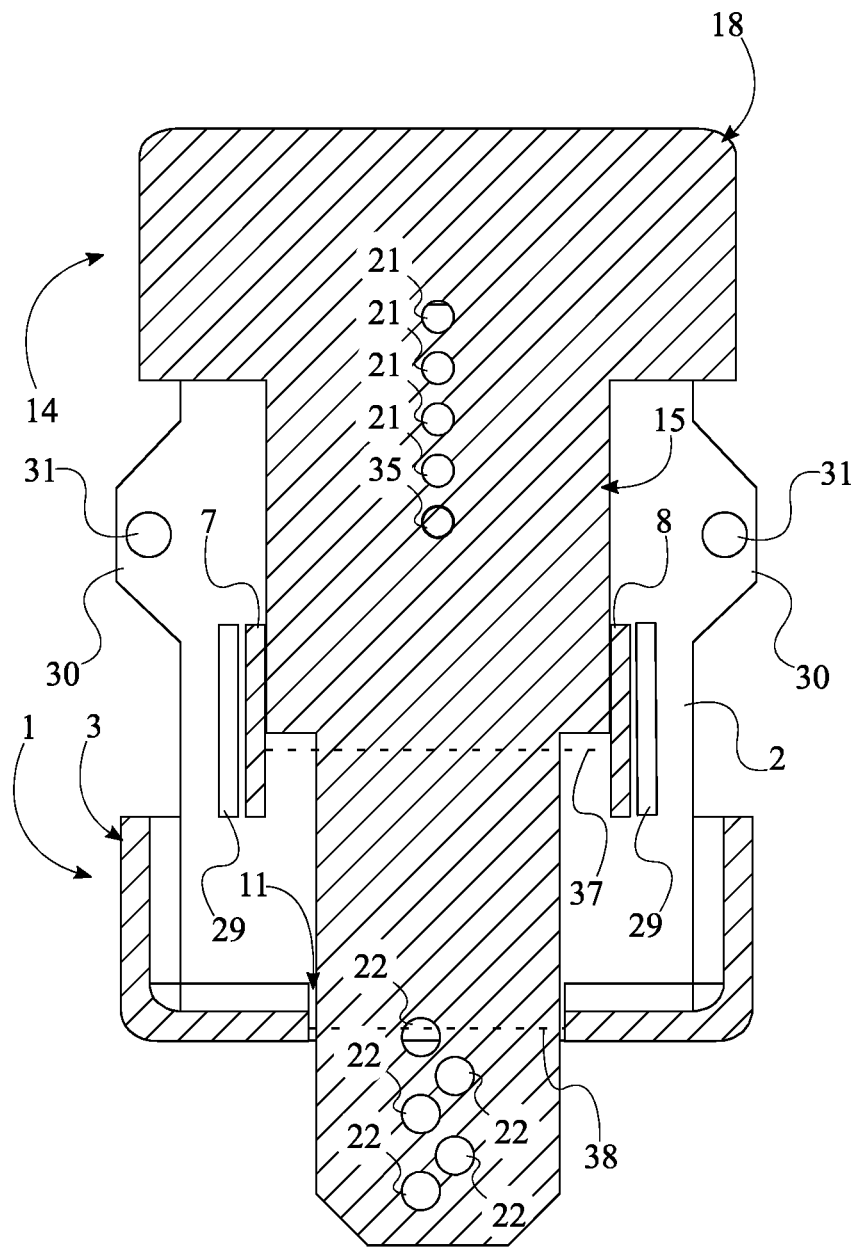
FIG. 6 is a cross-section view of FIG. 4 along line 6-6 of the present invention.

In order for the height-adjustable plate 15 of the slideable jaw 14 to freely slide, a first opening 9 and a second opening 10 is defined by the third lateral wall 6 and the mounting plate 2, as seen in FIG. 1 and FIG. 5. More specifically, the first opening 9 and the second opening 10 are positioned in between the first end 7 and the second end 8 of the third lateral wall 6. The first opening 9, the second opening 10, and the main slot 11 are oriented parallel with each other. In the preferred embodiment of the present invention, a width 38 of the main slot 11 is smaller than a width 37 between the first end 7 and the second end 8 of the third lateral wall 6, seen in FIG. 6. The height-adjustable plate 15 therefore does not slide entirely through the main slot 11 and the second head 18 does not press directly against the first head 3.

Figure 2:
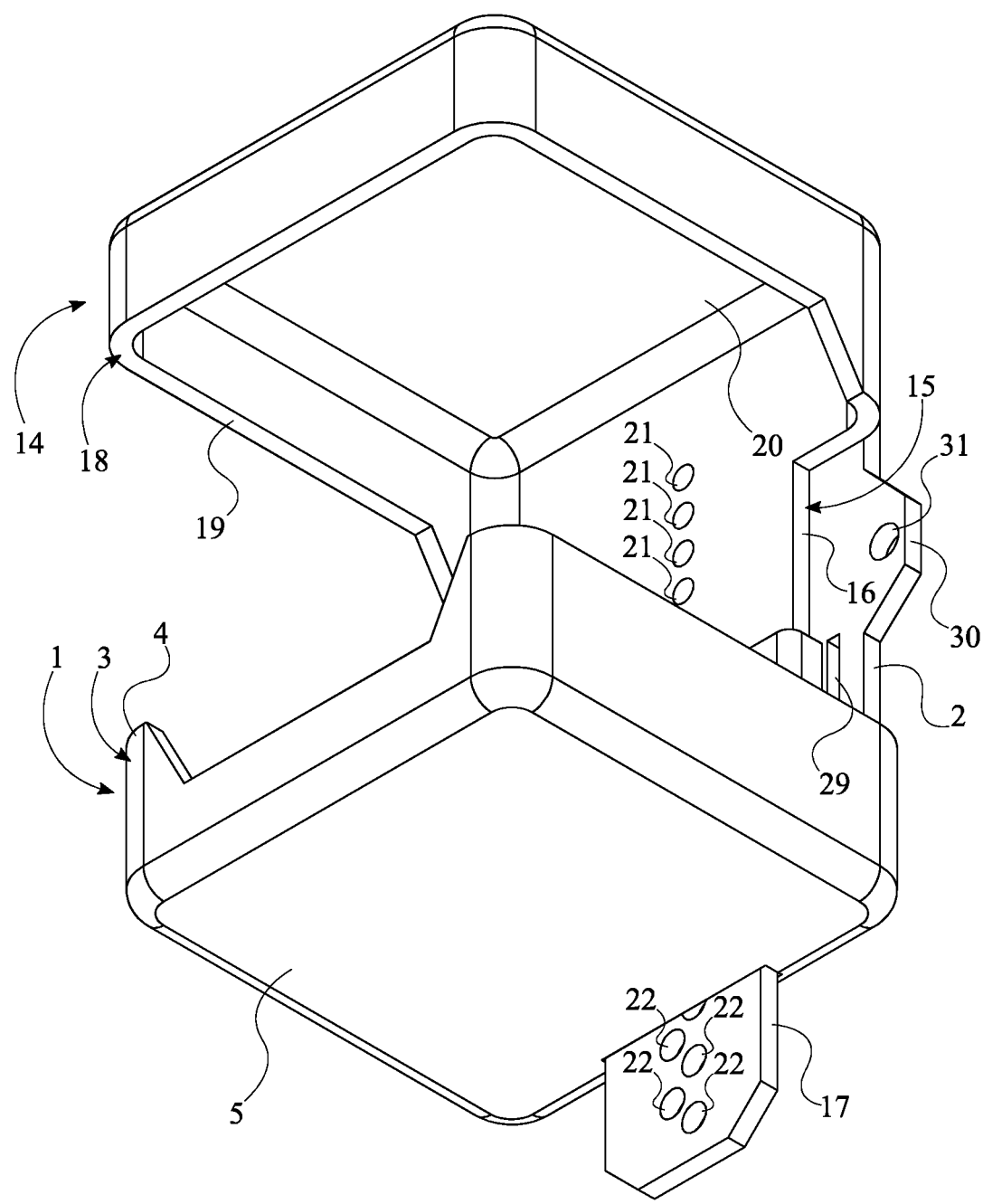
FIG. 2 is a bottom perspective view of the present invention.
Figure 3:
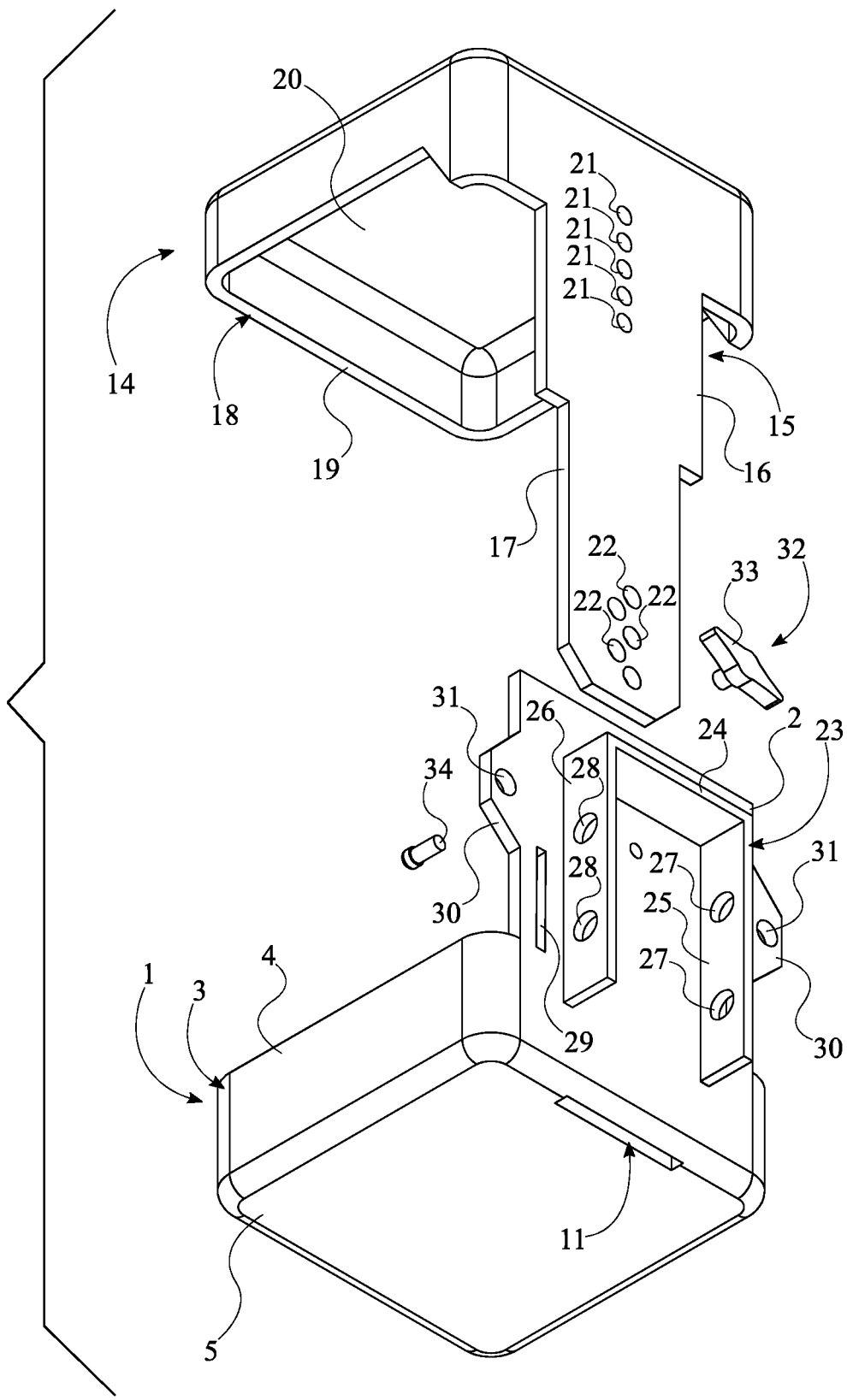
FIG. 3 is a rear exploded view of the present invention.

The present invention comprises a compact structure while being able to effectively house a camera as the height-adjustable plate 15 comprises a first portion 16 and a second portion 17, seen in FIG. 1, FIG. 2, and FIG. 3. The second head 18 is terminally fixed to the first portion 16, and the first portion 16 is positioned in between the second head 18 and the second portion 17. This arrangement allows the height-adjustable plate 15 to remain pressed with the mounting plate 2 while offsetting the first head 3 from the second head 18. Moreover, the first portion 16 is slidably engaged with the third lateral wall 6 and the mounting plate 2. Similarly, the second portion 17 is slidably engaged with the main slot 11. In the preferred embodiment of the present invention, the first portion 16 comprises a width that is larger than a width of the second portion 17. This structure allows the first portion 16 to serve as a stopper or bumper for the slideable jaw 14 such that the entire height-adjustable plate 15 does not slip through the main slot 11.

The first portion 16 is connected with the mounting plate 2 as the plurality of interconnecting holes 21 traverses through the first portion 16 and is distributed across the first portion 16. In order for the plurality of interconnecting holes 21 to accommodate varying sizes of cameras, each of the plurality of interconnecting holes 21 is aligned with the main interconnecting hole 13. This arrangement allows the height-adjustable plate 15 to continuously and smoothly traverse across the mounting plate 2. The second portion 17 allows a fastener, preferably a padlock, to lock the slideable jaw 14 with the fixed jaw 1, as the at least one locking hole 22 traverses through the second portion 17. More specifically, the at least one locking hole 22 is positioned opposite the first portion 16, across the second portion 17, accounting for large cameras.

Figure 4:
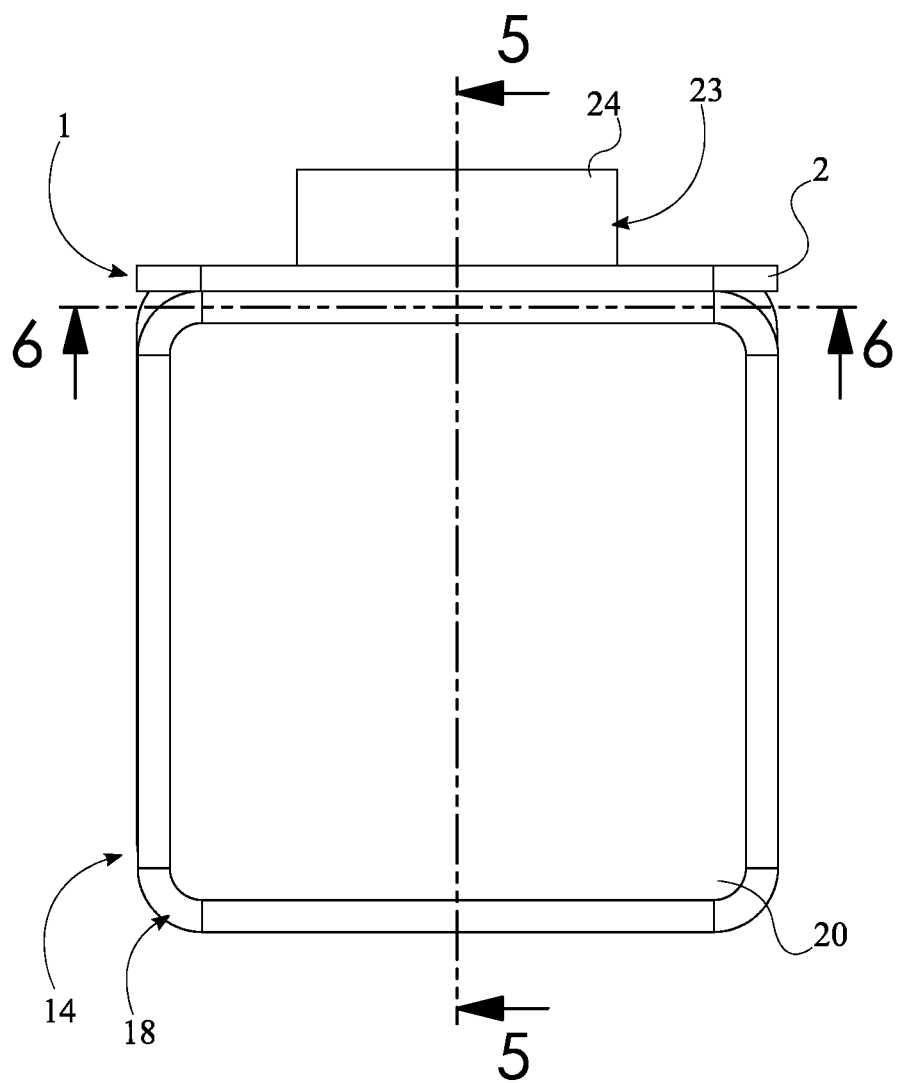
FIG. 4 is top side view of the present invention.

The fixed jaw 1 and the slideable jaw 14 prevent a camera from sliding laterally and slipping past the grip of the first head 3 and the second head 18 as the first head 3 further comprises a first lateral wall 4 and a first base plate 5. Similarly, the second head 18 further comprises a second lateral wall 19 and a second base plate 20. A horizontal cross-section of the first base plate 5 and a horizontal cross-section of the second base plate 20 mirror each other in shape and size. More specifically, the first base plate 5 and the second base plate 20 preferably each comprise a square horizontal cross-section shape, seen in FIG. 4. It is understood that various embodiments of the present invention may comprise a first base plate 5 and a second base plate 20 that accommodate the shape and structure of a corresponding camera. The first lateral wall 4 and the second lateral wall 19 wrap around the corresponding terminal ends of the camera. The first base plate 5 and the second base plate 20 both press against terminal ends of the camera, thereby clamping the camera while preserving the structural integrity of the camera. In order to preserve the structural integrity of the camera, the first lateral wall 4 is perimetrically fixed with the first base plate 5. The camera does not slip past the grip of the first base plate 5 as the first lateral wall 4 is oriented perpendicular with the first base plate 5. Moreover, the first lateral wall 4 is positioned in between the first base plate 5 and the mounting plate 2. Similarly, the second lateral wall 19 is perimetrically fixed with the second base plate 20 and is oriented perpendicular with the second base plate 20. The second lateral wall 19 is positioned in between the second base plate 20 and the height-adjustable plate 15. This arrangement safely secures the camera between the fixed jaw 1 and the slideable jaw 14.

In order for the mounting plate 2 to be mounted onto a surface without inhibiting the path and connection of the slideable jaw 14 with the fixed jaw 1, the present invention comprises a mounting bracket 23, seen in FIG. 3. The mounting bracket 23 is fixed adjacent the mounting plate 2, positioned opposite both the third lateral wall 6 and the first head 3. In the preferred embodiment of the present invention, the mounting bracket 23 comprises a connecting arm 24, a first lateral arm 25, a second lateral arm 26, at least one first hole 27, and at least one second hole 28. The connecting arm 24 is fixed in between the first lateral arm 25 and the second lateral arm 26. More specifically, the connecting arm 24 is oriented perpendicular with the first lateral arm 25 and the second lateral arm 26 and is positioned opposite the first head 3, across the mounting plate 2. The mounting bracket 23 may be secured to a tree trunk or pole with a zip tie, a pole clamp, or a variety of other similar fasteners as the at least one first hole 27 laterally traverses through the first lateral arm 25 and the at least one second hole 28 laterally traverses through the second lateral arm 26.

The mounting plate 2 may be directly mounted onto a surface as the present invention comprises at least one mounting slot 29, shown in FIG. 1, FIG. 2, FIG. 3, and FIG. 6. The at least one mounting slot 29 traverses through the mounting plate 2 and is positioned terminally adjacent the third lateral wall 6. In the preferred embodiment of the present invention, the at least one mounting slot 29 is a couple of mounting slots. Moreover, the third lateral wall 6 is preferably positioned in between the couple of mounting slots. The present invention further comprises at least one mounting tab 30 and at least one mounting hole 31, also shown in FIG. 1, FIG. 2, FIG. 3. The at least one mounting tab 30 is fixed with the mounting plate 2 and is laterally positioned along the mounting plate 2. The at least one mounting hole 31 traverses through the at least one mounting tab 30. In the preferred embodiment of the present invention, the at least one mounting tab 30 is a couple of mounting tabs positioned opposite each other about the mounting plate 2. This arrangement structurally reinforces the connection of the mounting plate 2 with the corresponding surface. It is understood that a variety of fasteners may be engaged with the at least one mounting slot 29 and the at least one mounting hole 31 that secure the mounting plate 2 onto a surface.

In order to fix the distance between the fixed jaw 1 and the slideable jaw 14, the present invention further comprises a main fastener 32, seen in FIG. 1, FIG. 3, and FIG. 5. The main comprises a knob 33 and a bolt 34 so that the distance between the fixed jaw 1 and the slideable is adjustable based on the size of the camera. More specifically, the bolt 34 comprises a head 35 and a shaft 36. The head 35 is terminally fixed to the shaft 36 and is oriented concentric with the shaft 36. The knob 33 is positioned opposite the head 35 across the shaft 36. Once a desired distance between the fixed jaw 1 and the slideable jaw 14 is established, the head 35 is positioned within an interconnecting hole of the plurality of interconnecting holes 21. Moreover, the shaft 36 traverses through the main interconnecting hole 13. The knob 33 is threadedly engaged with the shaft 36, securing the position of the head 35 and the knob 33 with the interconnecting hole and the main interconnecting hole 13, respectively. More specifically, the mounting plate 2 is positioned in between the head 35 and the knob 33.

Although the invention has been explained in relation to its preferred embodiment, it is to be understood that many other possible modifications and variations can be made without departing from the spirit and scope of the invention as hereinafter claimed.

What is claimed is:

1. A universal security box for surveillance equipment comprises:
   a fixed jaw;
   a slideable jaw;
   a main fastener;
   the fixed jaw comprises a mounting plate, a first head, a third lateral wall, a main slot, and a main interconnecting hole;
   the slideable jaw comprises a height-adjustable plate, a second head, a plurality of interconnecting holes, and at least one locking hole;
   the first head being terminally fixed adjacent the mounting plate;
   the second head being terminally fixed adjacent the height-adjustable plate;
   a first end and a second end of the third lateral wall being fixed adjacent the mounting plate;
   the main slot traversing through the first head, positioned adjacent the mounting plate;
   the height-adjustable plate being slidably engaged between the third lateral wall and the mounting plate and through the main slot;
   the main interconnecting hole laterally traversing through the mounting plate;
   the plurality of interconnecting holes traversing through the height-adjustable plate; and,
   the slideable jaw being removably attached with the fixed jaw with the main fastener through the main interconnecting hole and a corresponding interconnecting hole.

2. The universal security box for surveillance equipment as claimed in claim 1 comprises:
   a first opening and a second opening being defined by the third lateral wall and the mounting plate;
   the first opening and the second opening being positioned in between the first end and the second end of the third lateral wall; and,
   the first opening, the second opening, and the main slot being oriented parallel with each other.

3. The universal security box for surveillance equipment as claimed in claim 1 comprises:
   the height-adjustable plate comprises a first portion and a second portion;
   the second head being terminally fixed to the first portion;
   the first portion being positioned in between the second head and the second portion;
   the first portion being slidably engaged with the third lateral wall and the mounting plate;
   the second portion being slidably engaged with the main slot;
   the plurality of interconnecting holes traversing through the first portion;
   the plurality of interconnecting holes being distributed across the first portion;
   each of the plurality of interconnecting holes being aligned with the main interconnecting hole;
   the at least one locking hole traversing through the second portion; and,
   the at least one locking hole being positioned opposite the first portion, across the second portion.

4. The universal security box for surveillance equipment as claimed in claim 1 comprises:
   a width of the main slot being smaller than a width between the first end and the second end of the third lateral wall.

5. The universal security box for surveillance equipment as claimed in claim 1 comprises:
   the first head comprises a first lateral wall and a first base plate;
   the first lateral wall being perimetrically fixed with the first base plate;
   the first lateral wall being oriented perpendicular with the first base plate; and,
   the first lateral wall being positioned in between the first base plate and the mounting plate.

6. The universal security box for surveillance equipment as claimed in claim 1 comprises:
   the second head comprises a second lateral wall and a second base plate;
   the second lateral wall being perimetrically fixed with the second base plate;
   the second lateral wall being oriented perpendicular with the second base plate; and,
   the second lateral wall being positioned in between the second base plate and the height-adjustable plate.

7. The universal security box for surveillance equipment as claimed in claim 1 comprises:
   a mounting bracket; and,
   the mounting bracket being fixed adjacent the mounting plate, positioned opposite both the third lateral wall and the first head.

8. The universal security box for surveillance equipment as claimed in claim 7 comprises:
   the mounting bracket comprises a connecting arm, a first lateral arm, a second lateral arm, at least one first hole, and at least one second hole;
   the connecting arm being fixed in between the first lateral arm and the second lateral arm;
   the connecting arm being oriented perpendicular with the first lateral arm and the second lateral arm;
   the connecting arm being positioned opposite the first head, across the mounting plate;
   the at least one first hole laterally traversing through the first lateral arm; and,
   the at least one second hole laterally traversing through the second lateral arm.

9. The universal security box for surveillance equipment as claimed in claim 1 comprises:
   at least one mounting slot;
   the at least one mounting slot traversing through the mounting plate; and,
   the at least one mounting slot being positioned terminally adjacent the third lateral wall.

10. The universal security box for surveillance equipment as claimed in claim 1 comprises:
    at least one mounting tab;
    at least one mounting hole;
    the at least one mounting tab being fixed with the mounting plate;
    the at least one mounting tab being laterally positioned along the mounting plate; and,
    the at least one mounting hole traversing through the at least one mounting tab.

11. The universal security box for surveillance equipment as claimed in claim 1 comprises:
    a main fastener;
    the main fastener comprises a knob and a bolt;
    the bolt comprises a head and a shaft;
    the head being terminally fixed to the shaft;

the head being oriented concentric with the shaft;
the knob being positioned opposite the head across the shaft;
the head being positioned within an interconnecting hole;
the shaft traversing through the main interconnecting hole;
the knob being threadedly engaged with the shaft; and,
the mounting plate being positioned in between the head and the knob.

12. A universal security box for surveillance equipment comprises:
a fixed jaw;
a slideable jaw;
a main fastener;
at least one mounting tab;
at least one mounting hole;
the fixed jaw comprises a mounting plate, a first head, a third lateral wall, a main slot, and a main interconnecting hole;
the slideable jaw comprises a height-adjustable plate, a second head, a plurality of interconnecting holes, and at least one locking hole;
the first head being terminally fixed adjacent the mounting plate;
the second head being terminally fixed adjacent the height-adjustable plate;
a first end and a second end of the third lateral wall being fixed adjacent the mounting plate;
the main slot traversing through the first head, positioned adjacent the mounting plate;
the height-adjustable plate being slidably engaged between the third lateral wall and the mounting plate and through the main slot;
the main interconnecting hole laterally traversing through the mounting plate;
the plurality of interconnecting holes traversing through the height-adjustable plate;
the slideable jaw being removably attached with the fixed jaw with the main fastener through the main interconnecting hole and a corresponding interconnecting hole;
the at least one mounting tab being fixed with the mounting plate;
the at least one mounting tab being laterally positioned along the mounting plate; and,
the at least one mounting hole traversing through the at least one mounting tab.

13. The universal security box for surveillance equipment as claimed in claim 12 comprises:
a first opening and a second opening being defined by the third lateral wall and the mounting plate;
the first opening and the second opening being positioned in between the first end and the second end of the third lateral wall; and,
the first opening, the second opening, and the main slot being oriented parallel with each other.

14. The universal security box for surveillance equipment as claimed in claim 12 comprises:
the height-adjustable plate comprises a first portion and a second portion;
the second head being terminally fixed to the first portion;
the first portion being positioned in between the second head and the second portion;
the first portion being slidably engaged with the third lateral wall and the mounting plate; the second portion being slidably engaged with the main slot;
the plurality of interconnecting holes traversing through the first portion;
the plurality of interconnecting holes being distributed across the first portion;
each of the plurality of interconnecting holes being aligned with the main interconnecting hole;
the at least one locking hole traversing through the second portion; and,
the at least one locking hole being positioned opposite the first portion, across the second portion.

15. The universal security box for surveillance equipment as claimed in claim 12 comprises:
a width of the main slot being smaller than a width between the first end and the second end of the third lateral wall.

16. The universal security box for surveillance equipment as claimed in claim 12 comprises:
the first head comprises a first lateral wall and a first base plate;
the first lateral wall being perimetrically fixed with the first base plate;
the first lateral wall being oriented perpendicular with the first base plate; and,
the first lateral wall being positioned in between the first base plate and the mounting plate.

17. The universal security box for surveillance equipment as claimed in claim 12 comprises:
the second head comprises a second lateral wall and a second base plate;
the second lateral wall being perimetrically fixed with the second base plate;
the second lateral wall being oriented perpendicular with the second base plate; and,
the second lateral wall being positioned in between the second base plate and the height-adjustable plate.

18. The universal security box for surveillance equipment as claimed in claim 12 comprises:
a mounting bracket;
the mounting bracket comprises a connecting arm, a first lateral arm, a second lateral arm, at least one first hole, and at least one second hole;
the mounting bracket being fixed adjacent the mounting plate, positioned opposite both the third lateral wall and the first head;
the connecting arm being fixed in between the first lateral arm and the second lateral arm;
the connecting arm being oriented perpendicular with the first lateral arm and the second lateral arm;
the connecting arm being positioned opposite the first head, across the mounting plate;
the at least one first hole laterally traversing through the first lateral arm; and,
the at least one second hole laterally traversing through the second lateral arm.

19. The universal security box for surveillance equipment as claimed in claim 12 comprises:
at least one mounting slot;
the at least one mounting slot traversing through the mounting plate; and,
the at least one mounting slot being positioned terminally adjacent the third lateral wall.

20. The universal security box for surveillance equipment as claimed in claim 12 comprises:
a main fastener;
the main fastener comprises a knob and a bolt;
the bolt comprises a head and a shaft;
the head being terminally fixed to the shaft;
the head being oriented concentric with the shaft;

the knob being positioned opposite the head across the shaft;

the head being positioned within an interconnecting hole;

the shaft traversing through the main interconnecting hole;

the knob being threadedly engaged with the shaft; and, the mounting plate being positioned in between the head and the knob.

* * * * *